(12) United States Patent
Good et al.

(10) Patent No.: US 10,368,075 B2
(45) Date of Patent: Jul. 30, 2019

(54) CLIP GENERATION BASED ON MULTIPLE ENCODINGS OF A MEDIA STREAM

(71) Applicant: Wowza Media Systems, LLC, Golden, CO (US)

(72) Inventors: Charles F. Good, Cincinnati, OH (US); Rob Elsner, Pine, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 16/282,670

(22) Filed: Feb. 22, 2019

(65) Prior Publication Data
US 2019/0191169 A1    Jun. 20, 2019

Related U.S. Application Data

(63) Continuation of application No. 14/619,325, filed on Feb. 11, 2015, now Pat. No. 10,218,981.

(51) Int. Cl.
*H04N 19/146*     (2014.01)
*H04N 19/33*      (2014.01)
(Continued)

(52) U.S. Cl.
CPC ......... *H04N 19/146* (2014.11); *H04N 19/172* (2014.11); *H04N 19/30* (2014.11);
(Continued)

(58) Field of Classification Search
CPC .. H04N 19/146; H04N 19/132; H04N 19/136; H04N 19/172; H04N 19/177; H04N 19/33; H04N 19/30; H04N 19/40
See application file for complete search history.

(56) References Cited

U.S. PATENT DOCUMENTS

| 5,991,798 A | * | 11/1999 | Ozaki | G11B 27/105 |
| | | | | 709/217 |
| 6,072,831 A | * | 6/2000 | Chen | H04N 19/159 |
| | | | | 375/240.03 |

(Continued)

OTHER PUBLICATIONS

"User Manual"; Version 6.41; IP.ClipLogger; http://www.evs.com/downloadcenter; EVS; Mar. 2014, 100 pages.
(Continued)

*Primary Examiner* — Joseph Suh
(74) *Attorney, Agent, or Firm* — Toler Law Group, PC

(57) ABSTRACT

A method includes receiving a media stream and generating first and second encoded versions of the media stream, the first encoded version associated with a first key frame interval and the second encoded version associated with a second key frame interval greater than the first key frame interval. The method also includes receiving, from a destination device, a request to generate a media clip, the request identifying a start point. The method further includes generating the media clip based on first sequence of frames of the first encoded version and second sequence of frames of the second encoded version. The first sequence begins at a first frame corresponding to the start point and ends at a second frame corresponding to a transition point. The second sequence begins at a third frame following the transition point and ends at a fourth frame corresponding to a stop point.

20 Claims, 4 Drawing Sheets

(51) Int. Cl.
  *H04N 19/30* (2014.01)
  *H04N 19/172* (2014.01)
  *H04N 19/40* (2014.01)
  H04N 19/132 (2014.01)
  H04N 19/177 (2014.01)
  H04N 19/136 (2014.01)

(52) U.S. Cl.
  CPC ............. *H04N 19/33* (2014.11); *H04N 19/40* (2014.11); *H04N 19/132* (2014.11); *H04N 19/136* (2014.11); *H04N 19/177* (2014.11)

(56) References Cited

U.S. PATENT DOCUMENTS

| | | | | |
|---|---|---|---|---|
| 7,558,760 B2* | 7/2009 | Fang | .................. | H04N 7/17336 705/50 |
| 7,926,080 B2* | 4/2011 | Baldwin | ............ | H04N 7/17336 375/240.13 |
| 8,401,188 B1* | 3/2013 | Swaminathan | ......... | G06F 21/10 380/200 |
| 8,532,171 B1* | 9/2013 | Narayanan | .......... | H04N 21/8451 375/240.01 |
| 2002/0026645 A1* | 2/2002 | Son | .................... | H04L 12/2801 725/117 |
| 2002/0053053 A1* | 5/2002 | Nagai | ................... | H04L 1/0002 714/712 |
| 2002/0061184 A1* | 5/2002 | Miyamoto | ............. | H04N 5/783 386/232 |
| 2002/0141740 A1* | 10/2002 | Matsui | .......... | H04N 21/234327 386/263 |
| 2002/0146236 A1* | 10/2002 | Kauffman | ............ | G11B 27/034 386/281 |
| 2003/0021346 A1* | 1/2003 | Bixby | .............. | H04N 21/23424 375/240.25 |
| 2003/0054810 A1* | 3/2003 | Chen | ....................... | H04L 29/06 455/422.1 |
| 2004/0093618 A1* | 5/2004 | Baldwin | ............ | H04N 7/17336 725/101 |
| 2005/0008074 A1* | 1/2005 | van Beek | ........... | H04N 21/2365 375/240.01 |
| 2005/0094809 A1* | 5/2005 | Pedlow, Jr. | ........ | H04N 7/17336 380/200 |
| 2006/0045363 A1* | 3/2006 | Dei | ....................... | H04N 7/152 382/232 |
| 2006/0095401 A1* | 5/2006 | Krikorian | ........... | H04N 21/4398 |
| 2007/0174880 A1* | 7/2007 | Fite | ................... | H04N 21/23424 725/87 |
| 2008/0019398 A1* | 1/2008 | Genossar | ............. | H04J 3/0632 370/498 |
| 2009/0157697 A1* | 6/2009 | Conway | ................. | G11B 27/00 |
| 2009/0220011 A1* | 9/2009 | Kursawe | .......... | H04N 21/23424 375/240.25 |
| 2010/0067571 A1* | 3/2010 | White | .................... | H04N 7/147 375/240.01 |
| 2010/0268633 A1* | 10/2010 | Rosenthal | .............. | G06Q 40/04 705/37 |
| 2011/0029873 A1* | 2/2011 | Eseanu | ................. | G11B 27/105 715/719 |
| 2012/0084404 A1* | 4/2012 | Haot | ..................... | G11B 27/034 709/219 |
| 2012/0259946 A1* | 10/2012 | Stockhammer | ....... | H04L 65/105 709/217 |
| 2012/0317302 A1* | 12/2012 | Silvestri | ............. | H04L 65/4076 709/231 |
| 2012/0331167 A1* | 12/2012 | Hunt | ....................... | G06F 21/10 709/231 |
| 2013/0019273 A1* | 1/2013 | Ma | ................. | H04N 21/234309 725/90 |
| 2013/0226983 A1* | 8/2013 | Beining | ............... | H04N 21/252 709/201 |
| 2013/0227062 A1* | 8/2013 | Lee | ..................... | H04L 65/4084 709/217 |
| 2013/0315570 A1* | 11/2013 | Jang | ................... | H04N 21/4325 386/326 |
| 2014/0047143 A1* | 2/2014 | Bateman | ................ | H04N 7/181 710/72 |
| 2014/0096002 A1* | 4/2014 | Dey | ...................... | G06F 3/0488 715/723 |
| 2015/0088965 A1* | 3/2015 | Pakulski | ............ | H04N 21/2387 709/203 |
| 2015/0180946 A1* | 6/2015 | Mellamphy | ........... | G06F 3/0484 715/738 |
| 2015/0296254 A1* | 10/2015 | Moore | ............... | H04N 21/4622 725/31 |
| 2016/0112484 A1* | 4/2016 | Liu | ..................... | H04L 65/4084 709/231 |
| 2016/0142750 A1* | 5/2016 | Huber | ................... | H04L 65/605 725/116 |
| 2016/0149980 A1* | 5/2016 | Karthikeyan | ....... | H04L 65/4076 709/219 |

OTHER PUBLICATIONS

"Auto Clipping Tool", User Manual; Version 6.41; IP.Director; EVS; http://www.evs.com/downloadcenter; Mar. 2014, 24 pages.
"Real-Time Video Sharing"; http://about.grabyo.com; London; 2014, 10 pages.
"Recorder Panel"; User Manual; Version 6.41; IP.Director; EVS; http://www.evs.com/downloadcenter; Mar. 2014, 24 pages.
"Vimond Highlights"; Vimond Highlights Media Solutions; http://www.vimond.com/products/vimond-highlights/; 2012; Obtained on Jan. 23, 2015, 3 pages.
"IP Clip Logger", EVS Application Notes, AN.IPCLIPLOGGER.01; http://www.evs.com/downloadcenter; Aug. 16, 2013, 8 pages.

* cited by examiner

US 10,368,075 B2

CLIP GENERATION BASED ON MULTIPLE ENCODINGS OF A MEDIA STREAM

PRIORITY CLAIM

This Application is a continuation of, and claims priority to, U.S. patent application Ser. No. 14/619,325, filed on Feb. 11, 2015, the content of which is incorporated by reference herein in its entirety

BACKGROUND

The popularity of the Internet, coupled with the increasing capabilities of personal/mobile electronic devices, has provided consumers with the ability to enjoy multimedia content almost anytime and anywhere. For example, live content (e.g., sports events) and video on demand (VOD) content (e.g., television shows and movies) can be streamed via the Internet to personal electronic devices (e.g., computers, mobile phones, Internet-enabled televisions, etc.). Various types of personal electronic devices are available to consumers. Different devices may have different screen sizes and may be compatible with different audio formats, video formats, streaming protocols, wireless connection speeds, etc.

Digital video content that can be delivered to personal electronic devices generally includes 3 types of video frames: intracoded frames (I-frames, alternately referred to as key frames), progressive frames (P-frames), and bi-directional frames (B-frames). An I-frame is a "complete" picture (e.g., image frame) that can be decoded independently of whether any preceding or subsequent frames have been received by a player device. Thus, I-frames can be said to have no dependencies on other frames. Decoding of a P-frame is dependent on preceding frame(s), and decoding of a B-frame is dependent on preceding frame(s) and/or future frame(s). Because I-frames have no dependencies, video playback at a player device typically begins once an I-frame is received. An I-frame tends to be larger and less efficient to decode than the other types of frames.

The capturing and sharing of video content between users is becoming increasingly common. For example, a user may record a video clip using a camera of their mobile phone, and the user may send the video clip to a friend or upload the video clip to an online video hosting service. After the video clip has been sent/uploaded, viewer(s) of the video clip may comment on the video clip, thereby sparking a conversation between users. Video clips may thus serve as a starting point for various online conversations. It may be more difficult, however, for a user to capture and communicate video clips of media while the user is viewing the media, such as a video clip of an in-progress movie, television show, or internet video stream. For example, by the time the user retrieves their mobile phone and begins recording, the item of interest (e.g., commercial, scene, sports play, etc.) may be over. Using a mobile device to record video being displayed on a different display device (e.g., a television or computer monitor) may also result in a low-quality video clip.

SUMMARY

Portable media player devices may experience fluctuations in bandwidth, such as between third generation (3G) channels, fourth generation (4G) channels, and Wi-Fi connections. One method of adjusting video delivery to accommodate bandwidth fluctuations is adaptive bitrate (ABR) streaming. To facilitate ABR streaming, a media server generates multiple bitrate "renditions" of a media stream, and player devices request different renditions at different times in response to bandwidth fluctuations. The present disclosure describes media clip generation techniques that are compatible with ABR streaming. For example, the described techniques may enable a media server to quickly and dynamically generate a media clip for a user at multiple bitrates, so that the clip is available for communication to various destination devices, which may have different available bandwidths, resolutions, etc.

In accordance with the described techniques, a media server may generate two encodings for a media stream. As used herein, an "encoding" for a media stream, alternately referred to as an "encoded stream" or "encoded version" of the media stream, includes a set of encoded video frames that are generated from the media stream. An encoding may optionally include audio content. The first encoding may be a key frame-only encoding and the second encoding may be a "normal" encoding. The first encoding may have a smaller key frame interval than the second encoding. As an illustrative non-limiting example, the first encoding may include only key frames and no predictive frames. As another example, the first encoding may include both key frames and predictive frames, but key frames may occur more frequently in the first encoding than in the second (e.g., "normal") encoding. The key frame interval of the first encoding may affect an accuracy (e.g., clipping resolution) of clip generation by limiting how close the clip generation can get to a user-selected start point and stop point for the clip. Thus, although various embodiments described herein may describe a key frame-only encoding, the present disclosure is not limited to requiring a key frame-only encoding. Further, the present disclosure includes embodiments in which the first encoding has a different frame pattern, e.g., a pattern other than one key frame for each frame of the second encoding. When a user watches the media stream, the user's device may be provided the second encoding. While watching the media stream, the user may desire to capture a video clip of part of the media stream (e.g., an amusing moment during a show or an exciting play during a sporting event). The user may request the media server for the clip by providing a start point (e.g., a timecode or frame number) and a stop point for the clip. The media server may dynamically generate the clip by concatenating frames of the first encoding to frames of the second encoding. In particular, the clip may include frames of the first encoding from the start point to a transition point, followed by frames of the second encoding from the transition point to the end point. The transition point may correspond to an earliest key frame of the second encoding following the start point. The media server may provide the clip (or a link to the clip) to the user, so that the user can share the clip with others (e.g., on social networking websites).

By using the key frame-only first encoding, the media server may be able to generate a user-requested clip even if the start point specified by the user is not a key frame in the second encoding. Moreover, because both encodings may be generated and cached by the media server while the original media stream is received, the media server may be able to generate user-requested clips quickly by accessing the cached encodings and concatenating frames from the cached encodings to generate the clips. When ABR streaming is supported, the media server may generate two encodings for each ABR rendition, so that media clips can be generated for each ABR rendition in response to a user request. When a viewer watches a media clip, the media clip may be delivered using an ABR rendition that is selected based on the bandwidth available to the device of the viewer. The described techniques may thus enable a user watching a low-quality version of a media stream to generate a clip that can be seen in high-quality by another user, and vice versa.

DETAILED DESCRIPTION

Figure 1:
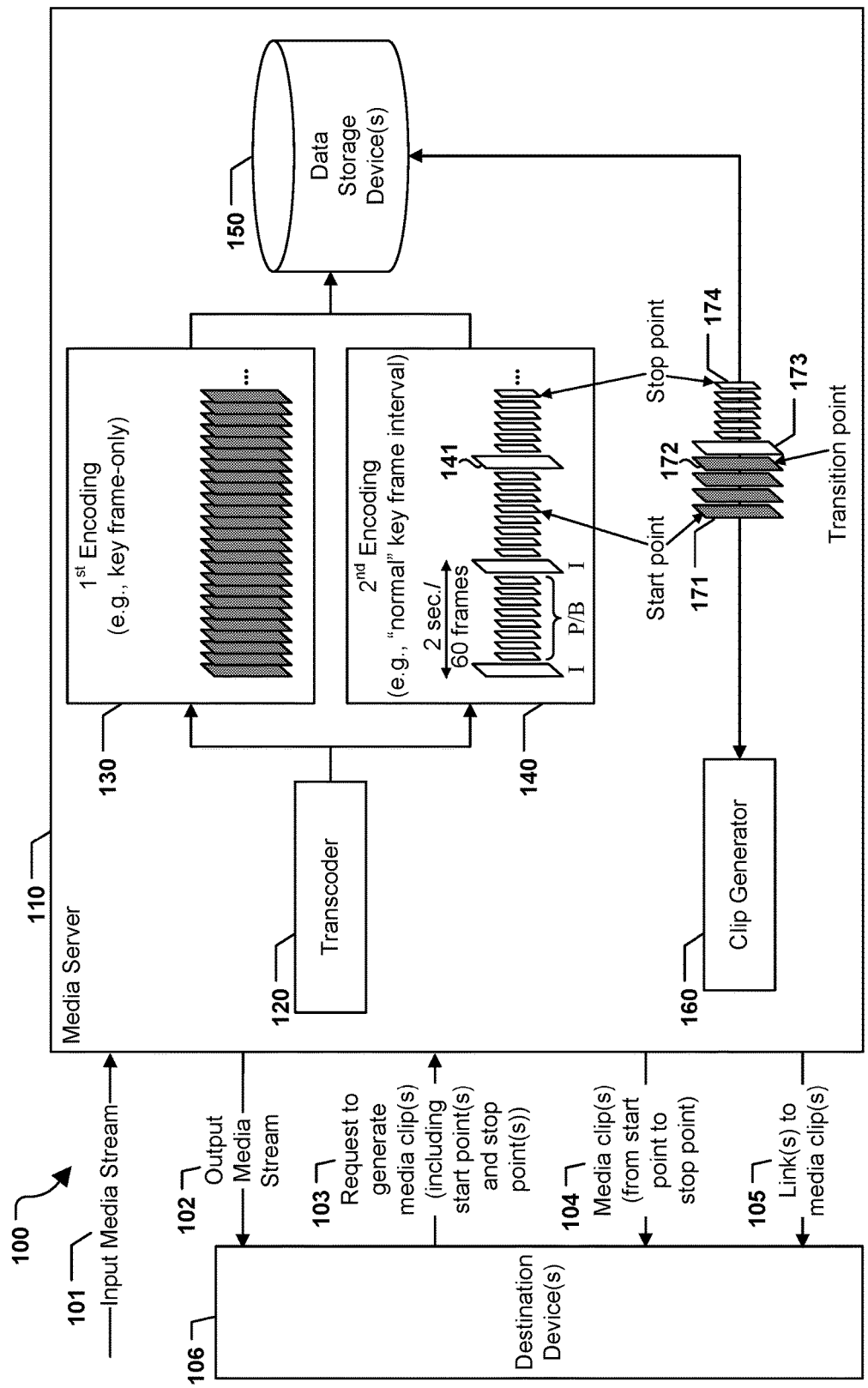
FIG. 1 is a diagram of a particular embodiment of a system that is operable to generate a media clip based on multiple encodings of a media stream.

FIG. 1 illustrates a particular embodiment of a system 100 that is operable to generate a media clip based on multiple encodings of a media stream. The system 100 includes a media server 110. The media server 110 is configured to receive data from and to send data to various other devices (e.g., via a network, such as a local area network (LAN) or the Internet, via a wired or wireless network connection). For example, the media server 110 may communicate with an external source (e.g., a stream capture source, a data storage device, another media server, etc.). To illustrate, the media server 110 may receive an input media stream 101 via one or more stream capture sources (e.g., a camera or a video encoder) or via one or more media content servers (e.g., a video on demand (VOD) database server or a server of a content delivery network (CDN)). The media server 110 may also communicate with one or more destination device(s) 106 (e.g., playback devices that are configured to output a display of a stream of live content and or a stream of a VOD content item) to send an output media stream 102 generated by the media server 110. It should be noted that although certain operations may be described herein as being performed by a "media server," in alternative embodiments such operations may be performed by one or more other types of devices, including but not limited to, desktop computers, laptop computers, smartphones, tablet computers, portable media players, cloud servers, etc.

The input media stream 101 may be a live stream or a VOD stream. In the case where the input media stream 101 is a live stream, the media server 110 may receive the input media stream 101 from a capture source (e.g., a camera or a video encoder). In the case where the input media stream 101 is a VOD stream, the media server 110 may receive the input media stream 101 from a storage device (e.g., a VOD database or VOD content server). The VOD stream may be received via hypertext transfer protocol (HTTP), network file system (NFS)-mounted disk, etc.

In a particular embodiment, the output media stream 102 is identical to the input media stream 101 (e.g., the media server 110 "passes through" the input media stream 101). Alternatively, the output media stream 102 may be a transcoded version of the input media stream 101. For example, the media server 110 may include a transcoder 120 that is configured to transcode the input media stream 101 to generate the output media stream 102.

The transcoder 120 may generate multiple versions of the input media stream 101. For example, to facilitate the use of adaptive bitrate (ABR) streaming, the transcoder 120 may generate multiple adaptive bitrate renditions of the input media stream 101. Each rendition of the input media stream 101 may have a distinct bitrate (e.g., video bitrate and/or audio bitrate). Renditions may also differ from each other with respect to other audio and video quality parameters, such as frame size, frame rate, video coder/decoder (CODEC), audio CODEC, number of audio channels, etc. Thus, the media server 110 may generate a plurality of ABR renditions of the input media stream 101, where each rendition of the plurality of ABR renditions has a particular bitrate. In a particular embodiment, the output media stream 102 is one of the ABR renditions of the input media stream 101.

In a particular embodiment, the transcoder 120 performs bitrate conversion, coder/decoder (CODEC) conversion, frame size conversion, etc. For example, the media server 110 may receive the input media stream 101 and the transcoder 120 may transcode the input media stream 101 to generate a first encoding 130 of the input media stream 101 and a second encoding 140 of the input media stream 101 at the media server 110. In FIG. 1, frames of the first encoding 130 are shaded and frames of the second encoding 140 are unshaded. Further, key frames are shown larger than non-key frames.

The first encoding 130 may have a first key frame (e.g., intracoded frame (I-frame)) interval. In a particular embodiment, the first key frame interval is equal to one frame, i.e., the first encoding 130 includes a key frame for each frame of the input media stream 101. For example, if the input media stream 101 includes the frame sequence $I_1P_1P_2BP_3P_4I_2$ (where "I," "P," and "B" correspond to I-frames, P-frames, and B-frames, respectively), then when the first key frame interval is equal to one frame, the first encoding 130 includes the frame sequence $I_1I_2I_3I_4I_5I_6I_7$.

Alternatively, the first key frame interval may be greater than one and/or may correspond to a clipping resolution of the media server 110. For example, when the first key frame interval is equal to two frames, the first encoding 130 includes a key frame for every other frame of the input media stream 101. To illustrate, if the input media stream 101 includes the frame sequence $I_1P_1P_2BP_3P_4I_2$, then when the first key frame interval is equal to two frames, the first encoding 130 includes the frame sequence $I_1I_2I_3I_4$, where frame $I_2$ of the first encoding 130 corresponds to frame $P_2$ of the input media stream 101 and frame $I_3$ of the first encoding 130 corresponds to frame $P_3$ of the input media stream 101. The first encoding 130 may thus be a key frame-only encoding of the input media stream 101.

The second encoding 140 may have a second key frame interval that is greater than the first key frame interval. For example, the second encoding 140 may be a "normal" key frame interval encoding that includes P-frames and/or B-frames in addition to I-frames. As an illustrative non-limiting example, the second key frame interval may be equal to approximately 2 seconds or approximately 60 frames, such that successive I-frames of the second encoding 140 are separated by approximately 2 seconds or 60 non I-frames. As used herein, the second encoding 140 may have a key frame interval that is "greater than" the key frame interval of the first encoding 130 by virtue of having key frames that are further apart, less frequent, or both.

The transcoder 120 may generate the first encoding 130 and the second encoding 140 in real-time or near-real-time with respect to receiving the input media stream 101. The first encoding 130 and the second encoding 140 may be stored (e.g., cached) at one or more data storage device(s) 150. The one or more data storage device(s) 150 may include non-volatile storage devices (e.g., disk-based storage device(s)), cache storage devices (e.g., static random-access memory (SRAM)), or a combination both.

In a particular embodiment, the communication between the media server 110 and the one or more destination device(s) 106 may include a request 103 to generate a media clip. The request 103 may be for a particular media clip or for a plurality of media clips. For example, while viewing the output media stream 102, a user at one of the destination devices 106 may decide to capture and share a commercial, a scene, a play during a sporting event, etc. The request 103 may identify a start point and a stop point for the requested media clip. The start point and the stop point may be indicated using frame numbers, timecodes, etc. As an illustrative non-limiting example, the user may interact with a media player interface to select a "clip" button or option, and may click/drag a pointer or cursor to specify the start and stop points, which the media player may convert into frame numbers or timecodes. In alternative embodiments, the user may specify the start and stop points in a different way. In a particular embodiment, if the user does not specify a stop point, the request may indicate or the media server may determine a default stop point, e.g., ten seconds following the start point as an illustrative non-limiting example.

In response to the request 103, the media server 110 may generate and output the requested media clip(s) 104, which include video data from the start point to the stop point. Alternatively or in addition, the media server 110 may generate and output link(s) 105 to the media clip(s) 104, where each link is selectable at a destination device to view the corresponding media clip.

In a particular embodiment, the media server 110 includes a clip generator 160 to generate the media clip(s) 104 and/or the link(s) 105 to the media clip(s) 104. The transcoder 120, the clip generator 160 may correspond to hardware, software, or a combination thereof. For example, the transcoder 120 and/or the clip generator 160 may be implemented using software classes, processor-executable instructions, etc. To generate a media clip, the clip generator 160 may access the first encoding 130 and the second encoding 140 stored at the data storage device(s) 150. In a particular embodiment, the clip generator 160 retrieves a first sequence of frames of the first encoding 130, retrieves a second sequence of frames of the second encoding 140, and concatenates the first sequence of frames and the second sequence of frames to generate the media clip 104.

For example, the request 103 may identify the start point and the stop point shown in FIG. 1. It is noted that in the example of FIG. 1, the start point does not correspond to a key frame. To generate the media clip 104, the clip generator 160 may retrieve a first sequence of frames of the first encoding 130 and a second sequence of frames of the second encoding 140. The first sequence of frames may begin at a first frame 171. The first frame 171 corresponds to the start point indicated by the request 103. It will be appreciated that by using the key frame-only first encoding 130, the clip generator 160 may generate the media clip 104 even when the start point corresponds to a P-frame or B-frame of the output media stream 102. If a key frame is not available for the start point, the first frame 171 may be the "closest" key frame to the start point. For example, the "closest" key frame to the start point may be the closest key frame in time, the closest key frame going back in time, or the closest key frame going forward in time. In some embodiments, the definition of the "closest" key frame and how to search for the "closest" key frame may be configurable by a user or administrator. Thus, as used herein, a key frame "corresponding" to a start (or stop) point does not necessarily mean that the key frame is for the exact frame represented by the start (or stop) point, and may instead mean a key frame that is "closest" to the start (or stop) point. The first sequence of frames may end at a second frame 172 corresponding to a transition point. As shown in FIG. 1, the transition point may correspond to the frame that immediately precedes the earliest key frame 141 of the second encoding 140 following the start point. The second sequence of frames may begin at a third frame 173 and end at a fourth frame 174. The third frame 173 may correspond to the key frame 141 and the fourth frame 174 may correspond to the stop point, as shown.

The clip generator 160 may concatenate the first sequence of frames and the second sequence of frames to generate the media clip 104. The media clip 104 may be sent from the media server 110 to one or more of the destination device(s) 106. For example, the media clip 104 may be sent to the destination device that sent the request 103. As another example, the media clip 104 may be sent to additional destination devices corresponding to users that did not request the media server 110 to generate the media clip 104. In a particular embodiment, the media clip 104 is stored at the data storage device(s) 150 and is provided to the destination device(s) on demand. For example, the clip generator 160 may provide one or more links 105 to the stored media clip 104. When a user at a destination device selects the link(s) 105, the media server 110 may retrieve the media clip 104 from the data storage device(s) 150 and send the media clip 104 to the destination device.

In a particular embodiment, the clip generator 160 may output a generated media clip to the transcoder 120 for further transcoding or compression. To illustrate, because an initial portion of the generated media clip is all key frames, the media clip may have a higher than desired bitrate (e.g., a higher bitrate than the output media stream 102). The transcoder 120 may compress the generated media clip by replacing one or more key frames of the media clip with predictive frames (e.g., P-frames or B-frames), and the compressed media clip may be stored in the data storage device(s) 150 and/or delivered to the destination device(s) 106.

Although the foregoing example illustrates generation of the media clip 104 based on a single concatenation operation, the present disclosure is not limited as such. In particular implementations, multiple concatenations of frame sequences may be performed by the clip generator 160 to generate the media clip 104. For example, assume that in the second encoding 140, the stop point corresponds to a B-frame that is dependent on an I-frame that follows the B-frame. In this scenario, the B-frame may not be decodable by a destination device until the I-frame following the B-frame is received. However, because the B-frame corresponds to the stop point of the media clip 104, the B-frame may be the last frame of the media clip 104. Thus, in this scenario, the media clip 104 may not be completely decodable at a destination device. To address such a scenario, while generating the media clip 104, the clip generator 160 may determine whether any frames of the second encoding 140 that are going to be included in the media clip 104 depend on a frame that will not be included in the media clip 104. If so, the clip generator 160 may replace such frames with frames from the first encoding 130, which are key frames and therefore do not depend on any other frames. As another example, when the start point specified by the request corresponds to a key frame of the second encoding 140, the clip generator 160 may generate the media clip 104 from the second encoding 140 without retrieving frames of the first encoding 130.

During operation, the media server 110 may receive the input media stream 101 and output the output media stream 102. The media server 110 may also generate the first encoding 130 and the second encoding 140, where the first encoding 130 is a key frame-only encoding and the second encoding 140 is a "normal" key frame interval encoding. When the media server 110 receives a request 103 to generate the media clip 104, the media server 110 may determine whether the media clip 104 was previously generated and stored at the data storage device(s) 150. If so, the media server 110 may retrieve the media clip 104 from the data storage device(s) 150 and send the media clip 104 (or the link(s) 105) to a requesting device. If the media clip 104 has not previously been generated, the media server 110 may generate the media clip 104 by concatenating frames from the first encoding 130 and the second encoding 140. The media server 110 may also store the generated media clip 104 at the data storage device(s) 150 for subsequent retrieval in response to another clip generation request, a selection of the link(s) 105 to the media clip 104, etc. In some examples, the media server 110 may optionally transcode/compress the media clip 104 prior to storage or delivery to a destination device. The system 100 of FIG. 1 may thus enable generation of a user-requested media clip based on a key frame-only encoding and a "normal" encoding of a media stream. It will be appreciated that by using the key frame-only first encoding and the "normal" second encoding for clip generation, the system 100 of FIG. 1 may generate clips even when the start point for the clip corresponds to a predictive frame. The system 100 of FIG. 1 may also reduce the number of frames that are processed in order to generate the clip. For example, even if the start point corresponds to a predictive frame in the second encoding 140, the clip generator 160 may retrieve a key frame for the start point from the first encoding 130 instead of trying to resolve the dependency of the predictive frame in the second encoding 140 by processing frames prior to the start point.

Figure 2:
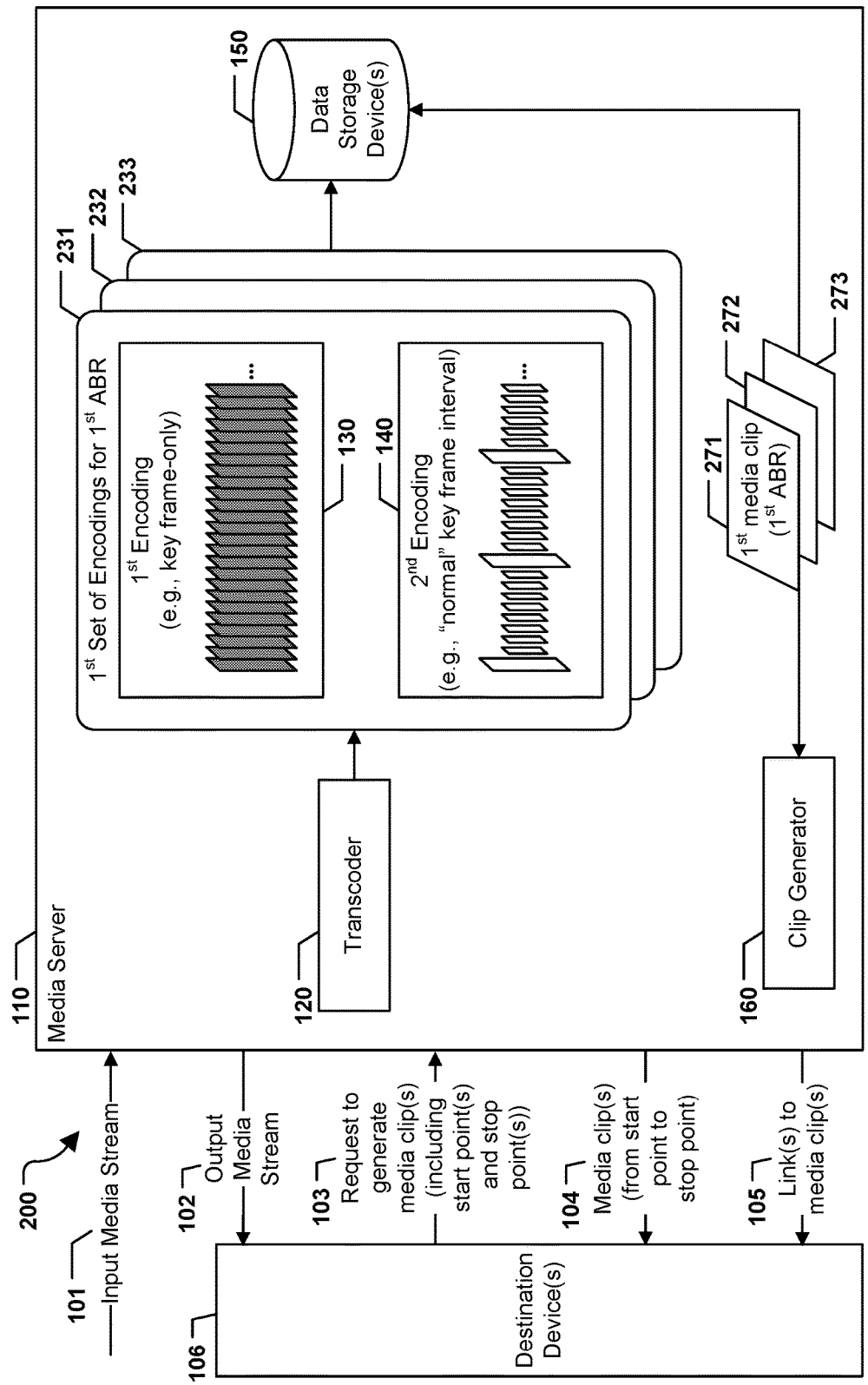
FIG. 2 is a diagram of another particular embodiment of a system that is operable to generate a media clip based on multiple encodings of a media stream.

In a particular embodiment, the media server 110 is configured to support ABR streaming of media clips. For example, FIG. 2 illustrates a system 200 that is operable to generate multiple ABR renditions of a media clip. As shown in FIG. 2, the transcoder 120 may generate a plurality of sets of encodings of the input media stream 101. Each set of encodings may correspond to a supported bitrate (e.g., to a respective ABR rendition of a plurality of ABR renditions of the input media stream 101). In FIG. 2, the first encoding 130 and the second encoding are included in a first set of encodings 231 for a first ABR. The transcoder 120 may also generate key frame-only and "normal" encodings for additional ABR renditions. For example, the transcoder 120 may generate a second set of encodings 232 for a second ABR rendition, a third set of encodings 233 for a third ABR rendition, etc.

Accordingly, each set of encodings 231-233 may include a key frame-only encoding and a "normal" encoding. Each set of encodings 231-233 may be stored at the data storage device(s) 150. For example, each set of encodings 231-233 may be cached by the media server 110, may be stored by the media server 110 at a non-volatile storage device (e.g., a disk-based storage device), may be stored at a network-attached storage device, etc.

When the media server 110 receives the request 103, the clip generator 160 may perform the operations as described with reference to FIG. 1 for each supported ABR rendition. For example, the clip generator 160 may concatenate frames of the first encoding 130 and the second encoding 140 to generate a first media clip 271 corresponding to the first ABR. The clip generator may concatenate frames of a key frame-only encoding and a "normal" encoding of the second set of encodings 232 to generate a second media clip 272 corresponding to the second ABR. The clip generator may concatenate frames of a key frame-only encoding and a "normal" encoding of the third set of encodings 233 to generate a third media clip 273 corresponding to the third ABR. It will be appreciated that each of the generated media clips 271-273 includes the same media content, but at a different bitrate. The media clips 271-273 may be stored at the data storage device(s) 150. The media server 110 may output the one or more of the clips 271-273 as the media clip(s) 104. For example, which of clips 271-273 is output to a particular destination device may be based on an available bandwidth at the destination device, a screen size of the destination device, etc. Alternatively, or in addition, the media server 110 may output links to the media clips 271-273 as the link(s) 105. In a particular embodiment, the link(s) 105 are part of an adaptive streaming manifest, so that a destination device 106 can request a specific one of the media clips 271-273 based on an available bandwidth at the destination device 106. Adaptive streaming manifests are further described with reference to FIG. 3.

The system 200 of FIG. 2 may thus enable generation of a media clip at multiple bitrates, so that the media clip can be viewed at different destination devices in different operating conditions (e.g., different available bandwidths, different screen sizes, etc.). The user requesting the media clip may be viewing a different quality rendition of a media stream than a user that subsequently views the clip. As an illustrative non-limiting example, the system 200 of FIG. 2 may enable a user to request clip generation while viewing a lower-quality rendition of a media stream (e.g., on a mobile phone), and the resulting media clip may be available in a higher-quality rendition for viewing by the user or by another user (e.g., on a set-top box).

Figure 3:
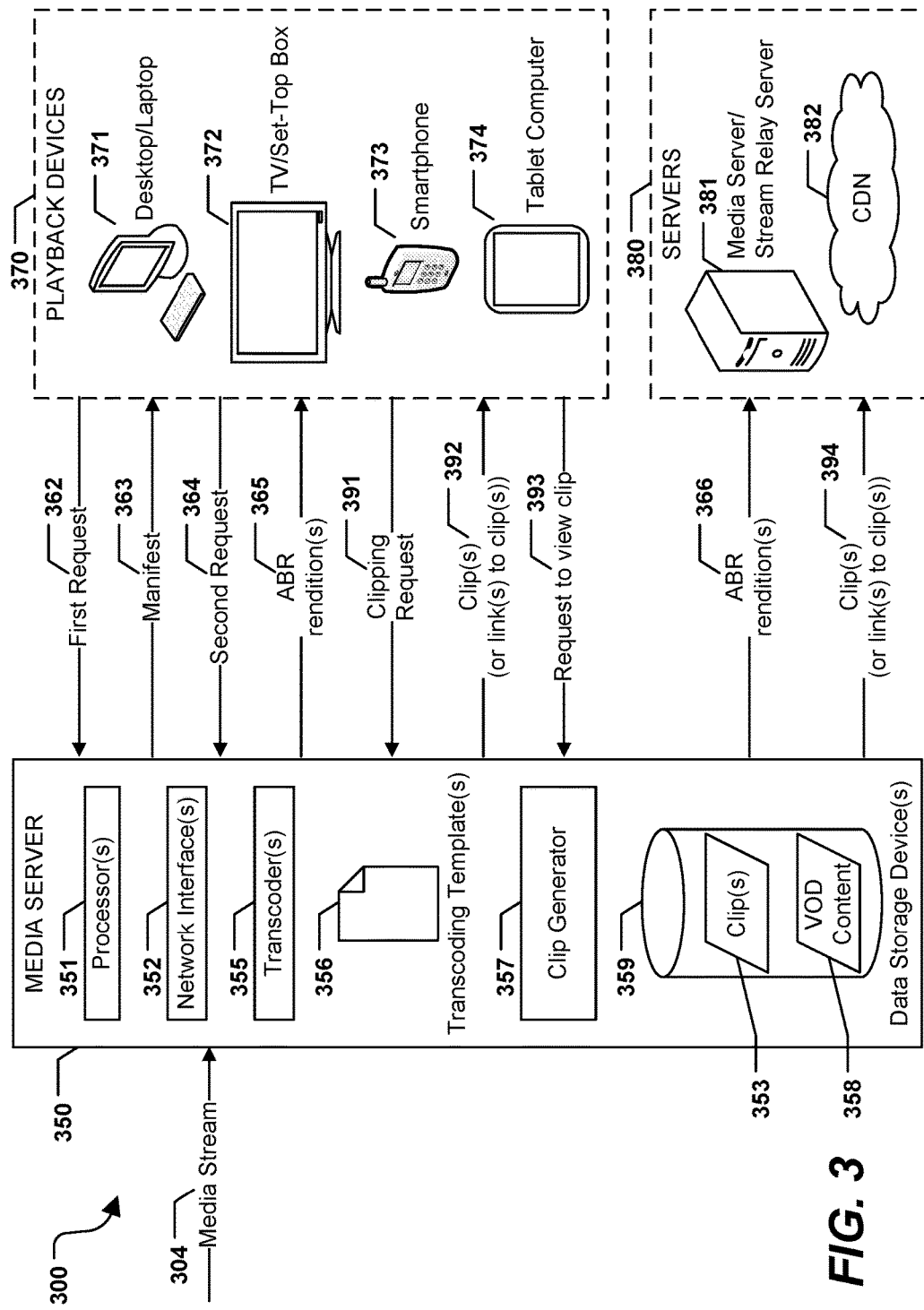
FIG. 3 is a diagram of another particular embodiment of a system that is operable to generate a media clip based on multiple encodings of a media stream.

FIG. 3 illustrates another particular embodiment of a system 300 that is operable to generate a media clip based on multiple encodings of a media stream. The system 300 includes a media server 350. The media server 350 may be the media server 110 of FIGS. 1-2. The media server 350 may receive a media stream 304 via one or more stream capture sources (e.g., a camera or a video encoder) or via one or more media content servers (e.g., a video on demand (VOD) database server or a server of a content delivery network (CDN)). Accordingly, the media stream 304 may include a live stream or a VOD stream. The media stream 304 may correspond to the input media stream 101 of FIGS. 1-2. The media server 350 is configured to receive and send data from various other devices (e.g., via a network, such as a local area network (LAN) or the Internet, via a wired or wireless network connection). For example, the media server 350 may communicate with one or more playback devices 370 (e.g., devices configured to output a display of a stream of live content and/or a stream of a VOD content item) and one or more other servers 380. The one or more playback devices 370 and/or the one or more other servers 380 may correspond to the destination device(s) 106 of FIGS. 1-2. For example, the playback device(s) 370 and/or the server(s) 380 may receive a media clip or a link to a media clip, as further described herein.

The media server 350 may include one or more processor(s) 351 and various components that are executable by the processor(s) 351. The media server 350 may include software application(s) that perform media serving or processing, hardware systems (e.g., servers) that support or perform media serving and processing, or any combination thereof. Thus, various operations described with reference to the media server 350, or components thereof, may be implemented using hardware, software (e.g., instructions executable by the processor(s) 351), or any combination thereof.

The media server 350 may include one or more network interface(s) 352. For example, the network interface(s) 352 may include input interface(s) and output interface(s) that are configured to receive data and to send data, respectively. In a particular embodiment, the network interface(s) 352 may be wired and/or wireless interfaces that enable the media server 350 to communicate data via a network, such as the Internet. For example, the network interface(s) 352 may include an Ethernet interface, a wireless interface compatible with an Institute of Electrical and Electronics Engineers (IEEE) 802.11 (e.g., Wi-Fi) protocol, or other wired or wireless interfaces.

The media server 350 may support multiple coding technologies and protocols. For example, the media server 350 may support video encoding types including, but not limited to, H.264, On2 VP6, Sorenson Spark, Screen video, Screen video 2, motion picture experts group (MPEG) 2 (MPEG-2), MPEG-4 Part 2, and MPEG-4 Part 10. The media server 350 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 350 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 350 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The media server 350 may also include one or more transcoder(s) 355. The transcoder(s) 355 may include the transcoder 120 of FIGS. 1-2. The transcoder(s) 355 may be configured to transcode the media stream 304 to generate multiple ABR rendition(s) 365 of the media stream 304. For example, the transcoder(s) 355 may generate a plurality of sets of encodings of the media stream 304. Each set of encodings of the plurality of sets of encodings may correspond to a respective ABR rendition of the media stream 304. Each set of encodings may include a key frame-only encoding and a "normal" encoding, as described with reference to FIGS. 1-2. The ABR rendition(s) 365, including any associated encodings, may be stored at one or more data storage device(s) 359. The data storage device(s) 359 may include the data storage device(s) 150 of FIGS. 1-2. In a particular embodiment, the data storage device(s) 359 also stores VOD content 358. For example, the transcoder(s) 355 may transcode the VOD content 358 to generate multiple ABR renditions of the VOD content 358, so that the media server 350 may provide VOD streams to one or more of the playback devices 370.

The ABR rendition(s) 365 of the media stream 304 may correspond to different quality renditions of the media stream 304. For example, the transcoder(s) 355 may generate a high-quality ABR rendition of the media stream 304 and/or may generate a lower-quality ABR rendition of the media stream 304 that is suitable for streaming in low-bandwidth network conditions. The transcoder(s) 355 may be configured to perform bitrate conversion, CODEC conversion, frame size conversion, etc. Moreover, such transcoding may be performed in response to requests from the playback devices 370. Thus, the media server 350 may be able to generate multiple ABR rendition(s) 365 of the media stream 304 for different playback devices 370 experiencing different network conditions.

The one or more ABR rendition(s) 365 may be sent to the one or more playback devices 370. For example, depending on a playback format supported by a requesting playback device 370, and/or transcoding parameters in use by the transcoder(s) 355, the media server 350 may send one or more ABR renditions to the playback devices 370 based on requests received from the playback devices 370. In a particular embodiment, parameters used by the transcoder(s) 355 are stored in one or more transcoding template(s) 356. For example, the transcoding template(s) 356 may be computer-readable files (e.g., eXtensible markup language (XML) files) that define transcoding parameters (e.g., bitrate, type of CODEC, etc.) for various stream renditions.

The media server 350 may also include a clip generator 357. The clip generator 357 may correspond to the clip generator 160 of FIGS. 1-2. The clip generator 357 may generate a clip(s) of the media stream 304. For example, the clip generator 357 may concatenate frames of different encodings of the media stream 304 to generate a clip, as described with reference to FIGS. 1-2.

During operation, the media server 350 may perform transcoding of the media stream 304 (and/or the VOD content 358 items) for adaptive streaming. As described above, adaptive streaming is a media transmission mechanism that enables a receiving device to dynamically request different versions of a stream in response to changing network conditions. For example, one of the playback devices 370 (e.g., a desktop or laptop computing device 371, a television or set-top box 372, a smartphone 373, or a tablet computer 374) may initiate an adaptive streaming session with the media server 350 for the media stream 304 (and/or a particular VOD content 358 item) by sending a first request 362. In an illustrative example, the first request 362 is generated in response to a user selecting a link to the media stream 304 (e.g., on a webpage), where the link specifies an Internet address of the media server 350. The media server 350 may send a manifest 363 to the initiating device (e.g., the computing device 371) in response to the first request 362. The manifest 363 may include information describing each of the plurality of ABR rendition(s) 365 (if any) of the media stream 304 and/or the VOD content 358 items. For example, the transcoding template(s) 356 may define particular available ABR rendition(s) 365 of the media stream 304 and the manifest 363 may be automatically generated based on the transcoding template(s) 356.

Upon receiving the manifest 363, the computing device 371 may determine which (if any) of the available ABR rendition(s) 365 of the media stream 304 should be requested from the media server 350. For example, the computing device 371 may make such a determination based on buffering/processing capability at the computing device 371 and/or network conditions being experienced by the computing device 371.

Upon determining which ABR rendition should be requested, the computing device 371 may transmit a second request 364 to the media server 350. The second request 364 may specify a particular ABR rendition of the media stream 304. If there are no problems with receipt and playback of the requested ABR rendition of the media stream 304, the computing device 371 may continue to receive the requested ABR rendition of the media stream 304 for continued playback. However, if playback and/or network conditions become worse, the computing device 371 may switch to a lower bitrate rendition by requesting a lower bitrate ABR rendition of the media stream 304. Conversely, if playback and/or network conditions improve, the computing device 371 may switch to a higher bitrate rendition. The transcoder(s) 355 may generate key frame aligned portions for the adaptive streaming renditions, so that switching to a lower bitrate or higher bitrate ABR rendition appears "seamless" (e.g., does not result in noticeable visual glitches or dropped frames at a playback device 370, such as the computing device 371, the television/set-top box 372, the smartphone 373, or the tablet computer 374).

Thus, during an adaptive streaming session, the media server 350 may receive the second request 364 from the computing device 371 for a particular ABR rendition of the media stream 304. Upon receiving the second request 364, the media server 350 may check whether the requested ABR rendition of the media stream 304 is stored in the one or more data storage device(s) 359. If so, the media server 350 may respond to the second request 364 by retrieving the requested ABR rendition from the one or more data storage device(s) 359 and transmitting the requested ABR rendition to the computing device 371. If the requested ABR rendition is part of a different ABR rendition, the transcoder(s) 355 may generate the requested ABR rendition by transcoding the media stream 304, and the generated ABR rendition(s) 365 may be transmitted to the computing device 371 in response to the second request 364. In a particular embodiment, sending the generated ABR rendition(s) 365 to the computing device 371 includes encoding and/or encapsulating the generated ABR rendition(s) 365 in accordance with the adaptive streaming protocol being used by the computing device 371 (e.g., HLS, HDS, smooth streaming, MPEG-DASH, etc.). As additional adaptive streaming requests are received from the computing device 371 for the same or other renditions of the VOD item, the transcoder(s) 355 may generate the additional requested portions on the fly as needed.

The media server 350 may receive, from one or more playback devices 370, a clipping request 391 to generate one or more clips 392 of the media stream 304 (and/or the VOD content 358 items). For example, the media server may provide a particular ABR rendition of the media stream 304 to the computing device 371. The media server 350 may receive the clipping request 391 from the computing device 371 while the media server 350 is providing the particular ABR rendition of the media stream 304 to the computing device 371. The clipping request 391 may include a start point for the requested media clip(s) 392, a stop point for the requested media clip(s) 392, ABR rendition(s) for which the media clip(s) 392 are to be generated, etc.

In response to the clipping request 391, the media server 350 may determine if the requested media clip(s) 392 are stored at the data storage device(s) 359 (which is illustrated in FIG. 3 as storing media clip(s) 353). If so, the media server 350 may retrieve the stored media clip(s) 392 from the data storage device(s) 359 and send the media clip(s) 392 to the requesting computing device 371. If not, the clip generator 357 may generate the requested media clip(s) 392, store the generated media clip(s) 392 in the data storage device(s) 359, and send the media clip(s) 392 to the requesting computing device 371. Alternatively, or in addition, the media server 350 may provide the computing device 371 link(s) to the media clip(s) 392, as described with reference to FIGS. 1-2.

In a particular embodiment, the media server 350 may receive a request 393 to view the media clip 392. For example, the request 393 may be generated in response to selection of a link to the media clip 392. In response to the request 393, the media server 350 may provide the media clip 392 to the requesting device. Alternatively, the media server 350 may provide a manifest to the requesting device, where the manifest includes multiple links to the media clip 392, each link corresponding to a different ABR rendition (e.g., bitrate) of the media clip 392. In another particular embodiment, the request 393 is generated based on selection of a particular ABR rendition of the media clip 392 specified in a manifest. When the media server 350 generates multiple ABR renditions of a media clip, playback of the media clip may switch between different bitrates, as described above with reference to the ABR rendition(s) 365.

The described techniques may also be used to generate and transmit multiple ABR rendition(s) 366 of the media stream 304 and/or multiple ABR rendition(s) of clip(s) 394 of the media stream 304 from the media server 350 to other servers 380. For example, the media server 350 may transmit generated ABR renditions of the media stream 304 and/or multiple ABR rendition(s) of the clip(s) 394 of the media stream 304 to another media server 381, a stream relay server, and/or to a server (e.g., an edge server) of a content delivery network (CDN) 382. To illustrate, the clip(s) may be sent to edge servers of the CDN 382 to make the clip more readily available to viewers in different geographic regions. In a particular embodiment, requested content at the CDN 382 may be set up using a pull through caching mechanism. The CDN 382 may include one or more edge HTTP caching servers. If a cache miss for requested content occurs at a caching server, the caching server may pull the requested content from the media server 350, which acts as an origin server. FIG. 3 thus illustrates a system 300 in which the media server 350 is configured to perform on-demand clip generation of live and VOD content, including support for ABR streaming of a clip and simultaneous output of the clip to multiple playback devices/servers.

Figure 4:
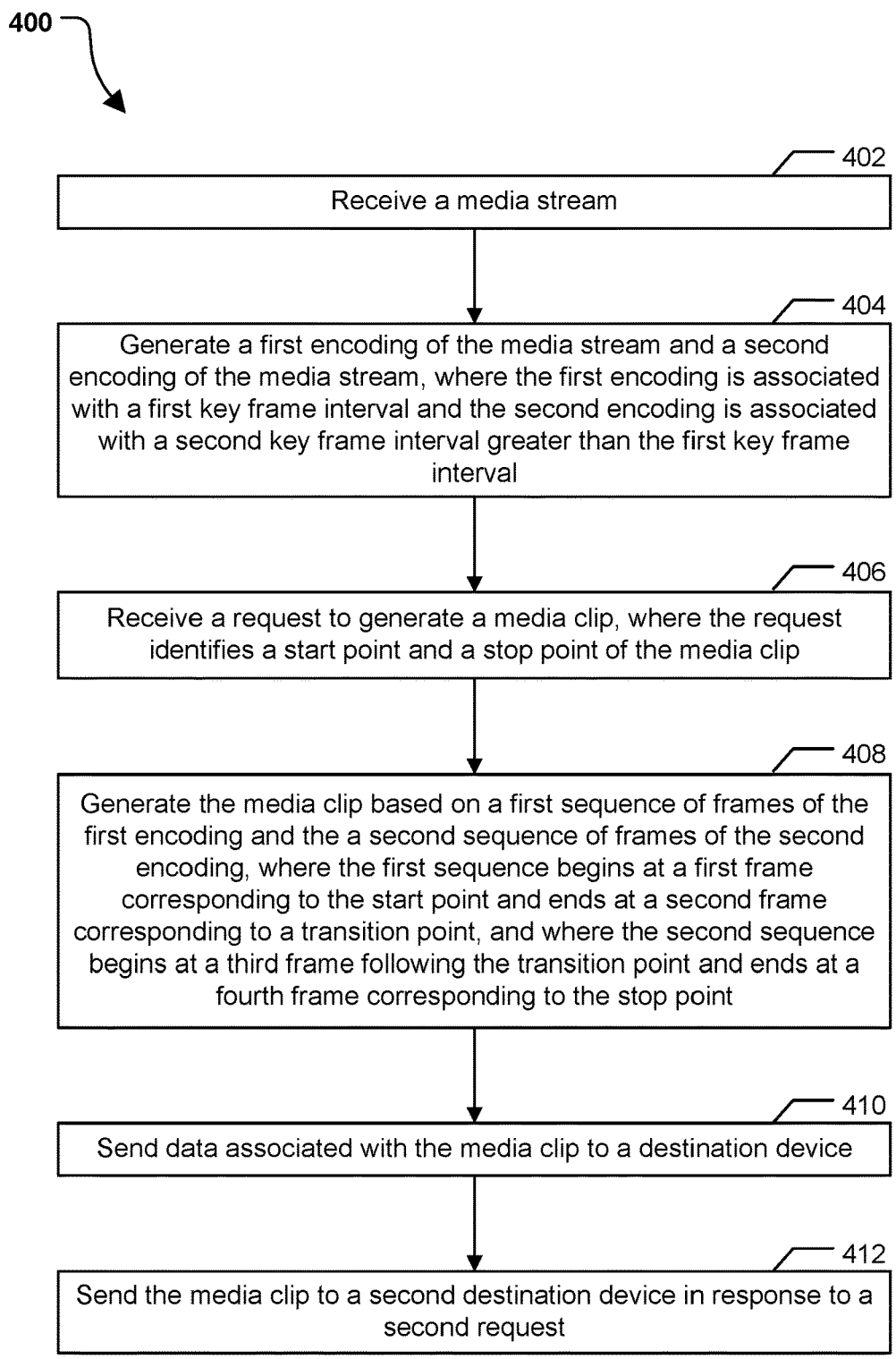
FIG. 4 is a flowchart of a particular embodiment of a method of generating a media clip based on multiple encodings of a media stream.

FIG. 4 is a flowchart to illustrate a particular embodiment of a method 400 of generating a media clip based on multiple encodings of a media stream. In an illustrative embodiment, the method 400 may be performed by the media server 110 of FIG. 1, the media server 110 of FIG. 2, or the media server 350 of FIG. 3.

The method 400 includes receiving a media stream, at 402. For example, in FIG. 1, the media server 110 may receive the input media stream 101. To illustrate, the media server 110 may receive the input media stream 101 from one or more stream capture sources (e.g., a camera or a video encoder associated with the capture of a live stream), via one or more media content servers (e.g., a video on demand (VOD) database server or a server of a content delivery network (CDN) associated with a VOD stream), from a data storage device, etc.

The method 400 also includes generating a first encoding of the media stream and a second encoding of the media stream, at 404. The first encoding may be associated with a first key frame interval and the second encoding may be associated with a second key frame interval that is greater than the first key frame interval. For example, in FIG. 1, the transcoder 120 may generate the first encoding 130 and the second encoding 140, where the second encoding 140 has a larger key frame interval than the first encoding 130. In the example of FIG. 1, the first encoding 130 has a key frame interval equal to one frame and the second encoding 140 has a key frame interval of approximately 2 seconds or 60 frames, although different key frame intervals may be used in alternative embodiments.

The method 400 may also include receiving a request to generate a media clip, at 406. The request may identify a start point and a stop point of the media clip. Alternatively, if the request does not identify a stop point, the media server may determine a default stop point (e.g., a particular duration following the start point). For example, in FIG. 1, the media server 110 may receive the request 103, where the request indicates the start point and the stop point of the media clip 104.

The method 400 may also include generating the media clip based on a first sequence of frames of the first encoding and a second sequence of frames of the second encoding, at 408. The first sequence may begin at a first frame corresponding to the start point and may end at a second frame corresponding to a transition point. The second sequence may begin at a third frame following the transition point and may end at a fourth frame corresponding to the stop point. For example, in FIG. 1, the clip generator 160 may generate the media clip 104 by concatenating the first sequence of frames (e.g., from the first frame 171 to the second frame 172) of the first encoding 130 with the second sequence of frames (e.g., from the third frame 173 to the fourth frame 174) of the second encoding 140.

The method 400 may also include sending data associated with the media clip from the media server to the destination device, at 410. The data may include the media clip itself and/or a link to the media clip. For example, in FIG. 1, the media server 110 may send the media clip 104 and/or the link 105 to the media clip 104 to one or more of the destination device(s) 106. The method 400 may further include sending the media clip to a second destination device in response to a second request, at 412. For example, if the user that originally requested the media clip shares the link to the media clip with a friend (e.g., via an e-mail message, a text message, an instant message, a social networking post, etc.), the media server may send the media clip to a device (e.g., mobile phone, tablet computer, set-top box, laptop computer, etc.) belonging to the friend when the friend selects the link. In an illustrative embodiment, the media server receives a second request to view the media clip from the friend's device and sends the media clip to the friend's device in response to the second request. When the friend's device has a different available bandwidth, screen size, etc. than the device of the user that originally requested the media clip, the two devices may be provided different ABR renditions of the media clip. The method 400 of FIG. 4 may thus enable automatic real-time or near-real-time generation of a media clip that is playable by different devices. In some embodiments, a clip may be provided to multiple devices at least partially simultaneously. For example, the media server may receive a request for a clip from a first device while the media server is providing the clip, or an ABR rendition thereof, to a second device.

It should be noted that the order of steps or operations described with reference to FIGS. 1-4 is to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof may include or may be included within any one or more of the media server 110 of FIGS. 1-2, the destination device(s) 106 of FIGS. 1-2, the media server 350 of FIG. 3, the desktop/laptop computing device 371 of FIG. 3, the TV/set-top box 372 of FIG. 3, the smartphone 373 of FIG. 3, the tablet computer 374 of FIG. 3, the media server/stream relay server 381 of FIG. 3, a server (e.g., edge server) of the CDN 382 FIG. 3, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). In addition to such live feeds, the described systems and methods may also be used in conjunction with "live linear television (TV)" streams. A live linear TV stream may correspond to a VOD asset being rebroadcast as a live feed. It should also be noted that although certain embodiments may be described herein with reference to video on demand, not all of the described techniques may require video content or data. Certain embodiments may also be used on demand content that does not include video (e.g., audio on demand radio or music streams).

In a particular embodiment, a method includes receiving a media stream. The method also includes generating a first encoding of the media stream and a second encoding of the media stream. The first encoding is associated with a first key frame interval and the second encoding is associated with a second key frame interval that is greater than the first key frame interval. The method also includes receiving, from a destination device, a request to generate a media clip. The request identifies a start point of the media clip. The method further includes generating the media clip based on a first sequence of frames of the first encoding and a second sequence of frames of the second encoding. The first sequence begins at a first frame corresponding to the start point and ends at a second frame corresponding to a transition point. The second sequence begins at a third frame following the transition point and ends at a fourth frame corresponding to a stop point of the media clip.

In another particular embodiment, an apparatus includes a processor and a network interface configured to receive a media stream and to receive a request to generate a media clip from a destination device. The request identifies a start point of the media clip. The apparatus also includes a transcoder executable by the processor to generate a first encoding of the media stream and a second encoding of the media stream. The first encoding is associated with a first key frame interval and the second encoding is associated with a second key frame interval that is greater than the first key frame interval. The apparatus also includes a clip generator executable by the processor to generate the media clip based on a first sequence of frames of the first encoding and a second sequence of frames of the second encoding. The first sequence begins at a first frame corresponding to the start point and ends at a second frame corresponding to a transition point. The second sequence begins at a third frame following the transition point and ends at a fourth frame corresponding to a stop point of the media clip.

In another particular embodiment, a computer-readable storage device stores instructions that, when executed by a computer, cause the computer to perform operations that include receiving a media stream. The operations also include generating a first encoding of the media stream and a second encoding of the media stream. The first encoding is associated with a first key frame interval and the second encoding is associated with a second key frame interval that is greater than the first key frame interval. The operations further include receiving, from a destination device, a request to generate a media clip. The request identifies a start point of the media clip. The operations include generating the media clip based on a first sequence of frames of the first encoding and a second sequence of frames of the second encoding. The first sequence begins at a first frame corresponding to the start point and ends at a second frame corresponding to a transition point. The second sequence begins at a third frame following the transition point and ends at a fourth frame corresponding to a stop point of the media clip. The instructions are also executable to cause the computer to perform operations that include sending data associated with the media clip to the destination device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   generating, at a server, a first encoded version of a media stream and a second encoded version of the media stream, wherein, for a portion of the second encoded version that includes at least two intracoded frames (i-frames), a corresponding portion of the first encoded version includes more than two i-frames;
   receiving, at the server from a destination device, a request to generate a media clip of the media stream, wherein the request identifies a start point of the media clip;
   generating the media clip at the server responsive to the request, the media clip based on a first sequence of frames of the first encoded version and a second sequence of frames of the second encoded version in response to the start point not corresponding to an i-frame of the second encoded version and an end frame corresponding to a stop point of the media clip not being in the first encoded version, wherein the first sequence begins at a first i-frame of the first encoded version corresponding to the start point and ends at a second i-frame of the first encoded version corresponding to a particular i-frame of the second encoded version, and wherein the second sequence begins at a third frame of the second encoded version following the particular i-frame of the second encoded version and ends at a fourth frame corresponding to the stop point of the media clip; and sending, from the server to the destination device, the media clip or a link to the media clip.

2. The method of claim 1, further comprising generating a plurality of sets of encoded versions of the media stream, wherein each set of the plurality of sets corresponds to a respective adaptive bitrate (ABR) rendition of a plurality of ABR renditions of the media stream.

3. The method of claim 2, further comprising, in response to the request, generating a plurality of media clips, each media clip of the plurality of media clips corresponding to a respective ABR rendition of the plurality of ABR renditions.

4. The method of claim 3, further comprising:
receiving, at the server, a second request for the media clip from a second destination device; and
sending a particular media clip of the plurality of media clips to the second destination device, the particular media clip selected based on bandwidth available to the second destination device.

5. The method of claim 1, further comprising:
determining that one or more particular frames of the second sequence are bi-predictive frames (b-frames), the one or more particular frames dependent on a first frame not included in the media clip; and
replacing the one or more particular frames with corresponding frames from the first encoded version.

6. The method of claim 1, further comprising generating, at the server in response to the start point corresponding to an i-frame of the second sequence, the media clip based only on the second encoded version.

7. The method of claim 1, further comprising generating, at the server in response to determining that the end frame of the media clip is in the first encoded version, the media clip based only on the first encoded version.

8. The method of claim 1, wherein the start point is indicated by a frame number or a timecode.

9. The method of claim 1, wherein the stop point corresponds to a particular amount of time after the start point in response to the request not including particular data corresponding to the stop point.

10. The method of claim 1, wherein the first encoded version and the second encoded version correspond to a particular adaptive bitrate (ABR) rendition of the media stream.

11. An apparatus comprising:
a processor;
a network interface coupled to the processor and configured to:
receive a media stream; and
receive a request to generate a media clip of the media stream from a destination device, wherein the request identifies a start point of the media clip;

a transcoder executable by the processor to generate a first encoded version of the media stream and a second encoded version of the media stream, wherein, for a portion of the second encoded version that includes at least two intracoded frames (i-frames), a corresponding portion of the first encoded version includes more than two i-frames; and a clip generator executable by the processor to generate the media clip after receipt of the request, wherein the media clip is based on a first sequence of frames of the first encoded version and a second sequence of frames of the second encoded version responsive to a first determination that the start point does not correspond to an i-frame of the second sequence and responsive to a second determination that an end frame corresponding to a stop point of the media clip is not in the first encoded version, wherein the first sequence begins at a first i-frame of the first encoded version corresponding to the start point and ends at a second i-frame of the first encoded version corresponding to a particular i-frame of the second encoded version, and wherein the second sequence begins at a third frame of the second encoded version following the particular i-frame of the second encoded version and ends at a fourth frame corresponding to the stop point of the media clip.

12. The apparatus of claim 11, further comprising a data storage device configured to store the first encoded version, the second encoded version, the media clip, or combinations thereof.

13. The apparatus of claim 11, wherein the media clip is based only on the first encoded version responsive to a determination that the end frame is in the first encoded version.

14. The apparatus of claim 11, wherein the media clip is based only on the second encoded version responsive to the start point corresponding to the i-frame of the second encoded version.

15. The apparatus of claim 11, wherein the first encoded version and the second encoded version correspond to a particular adaptive bitrate (ABR) rendition of the media stream.

16. A non-transitory computer-readable medium storing instructions that, when executed by a processor, cause the processor to perform operations, the operations comprising:
generating a first encoded version of a media stream and a second encoded version of the media stream, wherein, for a portion of the second encoded version that includes at least two intracoded frames (i-frames), a corresponding portion of the first encoded version includes more than two i-frames;
receiving, from a destination device, a request to generate a media clip of the media stream, wherein the request identifies a start point of the media clip;
generating the media clip responsive to the request, the media clip based on a first sequence of frames of the first encoded version and a second sequence of frames of the second encoded version in response to the start point not corresponding to an i-frame of the second encoded version and an end frame corresponding to a stop point of the media clip not being in the first encoded version, wherein the first sequence begins at a first i-frame of the first encoded version corresponding to the start point and ends at a second i-frame of the first encoded version corresponding to a particular i-frame of the second encoded version, and wherein the second sequence begins at a third frame of the second encoded version following the particular i-frame of the second encoded version and ends at a fourth frame corresponding to a stop point of the media clip; and sending, to the destination device, the media clip or a link to the media clip.

17. The non-transitory computer-readable medium of claim 16, wherein the operations further comprise:

determining that one or more particular frames of the second sequence are bi-predictive frames (b-frames), the one or more particular frames dependent on a first frame not included in the media clip; and replacing the one or more particular frames with corresponding frames from the first encoded version.

18. The non-transitory computer-readable medium of claim 16, wherein the operations further comprise generating, in response to the start point corresponding to an i-frame of the second sequence, the media clip based only on the second encoded version.

19. The non-transitory computer-readable medium of claim 16, wherein the operations further comprise generating, in response to determining that the end frame of the media clip is in the first encoded version, the media clip based only on the first encoded version.

20. The non-transitory computer-readable medium of claim 16, wherein data that identifies the stop point is included in the request.

* * * * *